United States Patent
Barron

(10) Patent No.: US 10,481,395 B2
(45) Date of Patent: Nov. 19, 2019

(54) SINGLE LCD FOR CLUSTER AND HUD

(71) Applicant: Panasonic Automotive Systems Company of America, Division of Panasonic Corporation of North America, Peachtree City, GA (US)

(72) Inventor: Thomas Barron, Farmington Hills, MI (US)

(73) Assignee: Pananasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 146 days.

(21) Appl. No.: 15/653,149

(22) Filed: Jul. 18, 2017

(65) Prior Publication Data

US 2018/0024358 A1    Jan. 25, 2018

Related U.S. Application Data

(60) Provisional application No. 62/364,644, filed on Jul. 20, 2016.

(51) Int. Cl.
| | | |
|---|---|---|
| *G02B 27/01* | (2006.01) | |
| *G02F 1/1347* | (2006.01) | |
| *G02F 1/1335* | (2006.01) | |

(52) U.S. Cl.
CPC ......... *G02B 27/0101* (2013.01); *G02B 27/01* (2013.01); *G02F 1/1347* (2013.01); *G02B 2027/0123* (2013.01); *G02B 2027/0147* (2013.01); *G02B 2027/0165* (2013.01); *G02B 2027/0187* (2013.01); *G02B 2027/0192* (2013.01); *G02F 2001/133626* (2013.01)

(58) Field of Classification Search
CPC .... G02B 27/0101; G02B 27/01; G02F 1/1347
See application file for complete search history.

(56) References Cited

U.S. PATENT DOCUMENTS

| | | | | |
|---|---|---|---|---|
| 2005/0128371 | A1* | 6/2005 | Ueda ..................... | C09K 19/02 349/33 |
| 2008/0204360 | A1* | 8/2008 | Schmidt ................. | G02B 27/01 345/7 |
| 2012/0069276 | A1* | 3/2012 | Ishikawa ............ | G02B 27/2214 349/103 |
| 2013/0196569 | A1* | 8/2013 | Cannon .................. | A63H 3/006 446/268 |
| 2014/0152941 | A1* | 6/2014 | Chen ..................... | G02B 6/0088 349/65 |

* cited by examiner

*Primary Examiner* — Lucy P Chien
(74) *Attorney, Agent, or Firm* — Laurence S. Roach, Esq.

(57) ABSTRACT

A combined head up display and instrument cluster arrangement for a motor vehicle includes a substantially planar liquid crystal display having a first side and a second side opposite the first side. A first area of the liquid crystal display is viewable as an instrument cluster display by a human viewer who is disposed closer to the first side than to the second side. A backlight is disposed closer to the first side than to the second side. The backlight is aligned with a second area of the liquid crystal display such that a light field is emitted by the backlight through the second area. Head up display optics are positioned to receive the light field.

21 Claims, 3 Drawing Sheets

SINGLE LCD FOR CLUSTER AND HUD

CROSS-REFERENCED TO RELATED APPLICATIONS

This application claims benefit of U.S. Provisional Application No. 62/364,644 filed on Jul. 20, 2016, which the disclosure of which is hereby incorporated by reference in its entirety for all purposes.

FIELD OF THE INVENTION

The disclosure relates to a head up display (HUD) and an instrument cluster in a motor vehicle.

BACKGROUND OF THE INVENTION

A head up display emits light that reflects from the front windshield to be seen by the driver. The light appears to come from a virtual image in front of the driver and in front of the windshield.

Conventional head up displays create the virtual image by first using a display to create an image. Next, the light from the image is reflected from one or more mirrors, and then the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Currently known vehicles include separate displays or image sources for the HUD and instrument cluster. Two separate displays are typically used to produce a cluster image and an HUD image.

SUMMARY

The present invention may provide a single liquid crystal display (LCD) to be used simultaneously as a vehicle cluster display and as a vehicle heads up display (HUD). The invention takes advantage of the fact that LCD panels, without the backlight guide/diffuser films/housing, are viewable from either side, given that there is a light source behind the side being viewed. Thus, a single LCD panel may be used for both the instrument cluster and to produce HUD images.

The invention may be implemented with an LCD having side lights, a light guide, diffuser layers, and a housing to illuminate the display towards the user. However, these additional layers may each have a notch or throughway which are mutually aligned to expose a section of the LCD panel. A second "backlight" may be disposed on the front of the LCD panel, and this second backlight may be aligned with only the exposed area of the LCD panel. The second "backlight" may illuminate the exposed section of the LCD panel in a direction away from the viewer, providing a light field or image that can be passed to HUD optics.

In one embodiment, the invention comprises a combined head up display and instrument cluster arrangement for a motor vehicle, including a substantially planar liquid crystal display having a first side and a second side opposite the first side. A first area of the liquid crystal display is viewable as an instrument cluster display by a human viewer who is disposed closer to the first side than to the second side. A backlight is disposed closer to the first side than to the second side. The backlight is aligned with a second area of the liquid crystal display such that a light field is emitted by the backlight through the second area. Head up display optics are positioned to receive the light field.

In another embodiment, the invention comprises a method of providing a head up display and an instrument cluster in a motor vehicle. A substantially planar liquid crystal display is provided including a first side and a second side opposite the first side. A first area of the liquid crystal display is viewable as an instrument cluster display by a human viewer who is disposed closer to the first side than to the second side. A backlight is disposed closer to the first side than to the second side. The backlight is aligned with a second area of the liquid crystal display. A light field is emitted from the backlight through the second area. Head up display optics are placed in position to receive the light field.

In yet another embodiment, the invention comprises a motor vehicle including a substantially planar liquid crystal display having a first side and a second side opposite the first side. A first area of the liquid crystal display is viewable as an instrument cluster display by a human viewer who is disposed closer to the first side than to the second side. A backlight is disposed closer to the first side than to the second side. The backlight emits a light field through the second area. Head up display optics are positioned to receive the light field after the light field has passed through the second area. A windshield is positioned to receive a first reflection of the light field from the head up display optics and provide a second reflection of the light field. The second reflection of the light field is visible to the human viewer as a virtual image.

An advantage of the present invention is that it reduces the number of video outputs that the head unit must provide.

Another advantage of the present invention is that it eliminates the need for a separate LCD/Backlight/Controller for each of the HUD and cluster.

Yet another advantage of the present invention is that it allows the combination of the cluster/HUD units to be more compact.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
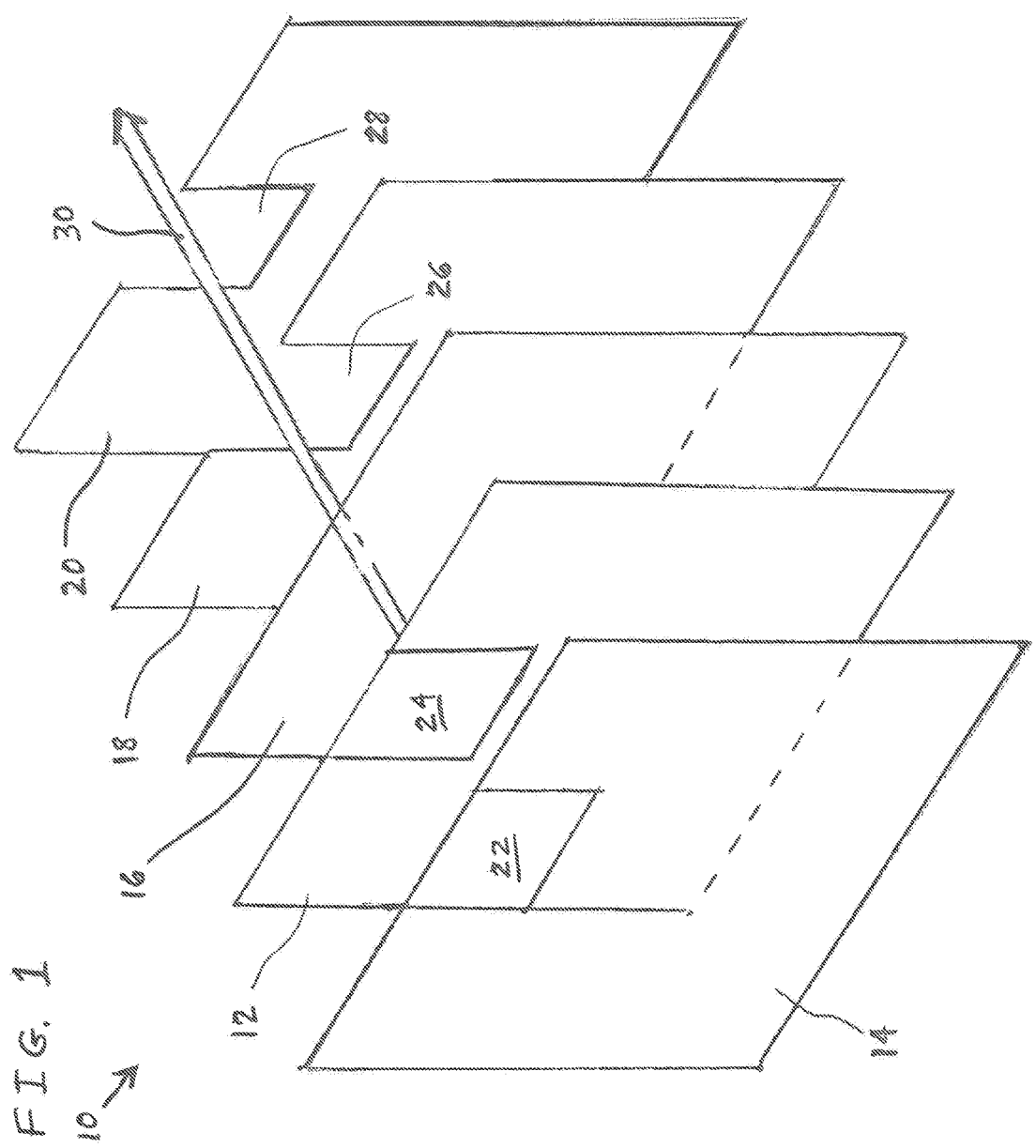
FIG. 1 is an exploded, perspective view of one embodiment of a combined HUD and instrument cluster arrangement of the present invention.

FIG. 1 illustrates one example embodiment of a combined HUD and instrument cluster arrangement 10 of the present invention, including an LCD 12, a front vertical polarizer 14, a rear horizontal polarizer 16, backlight films 18 and a display housing 20. Front vertical polarizer 14 includes an attached square-shaped HUD backlight 22 which is aligned with a square HUD area 24 on LCD 12, and respective square notches 26, 28 on backlight films 18 and display housing 20.

Figure 2:
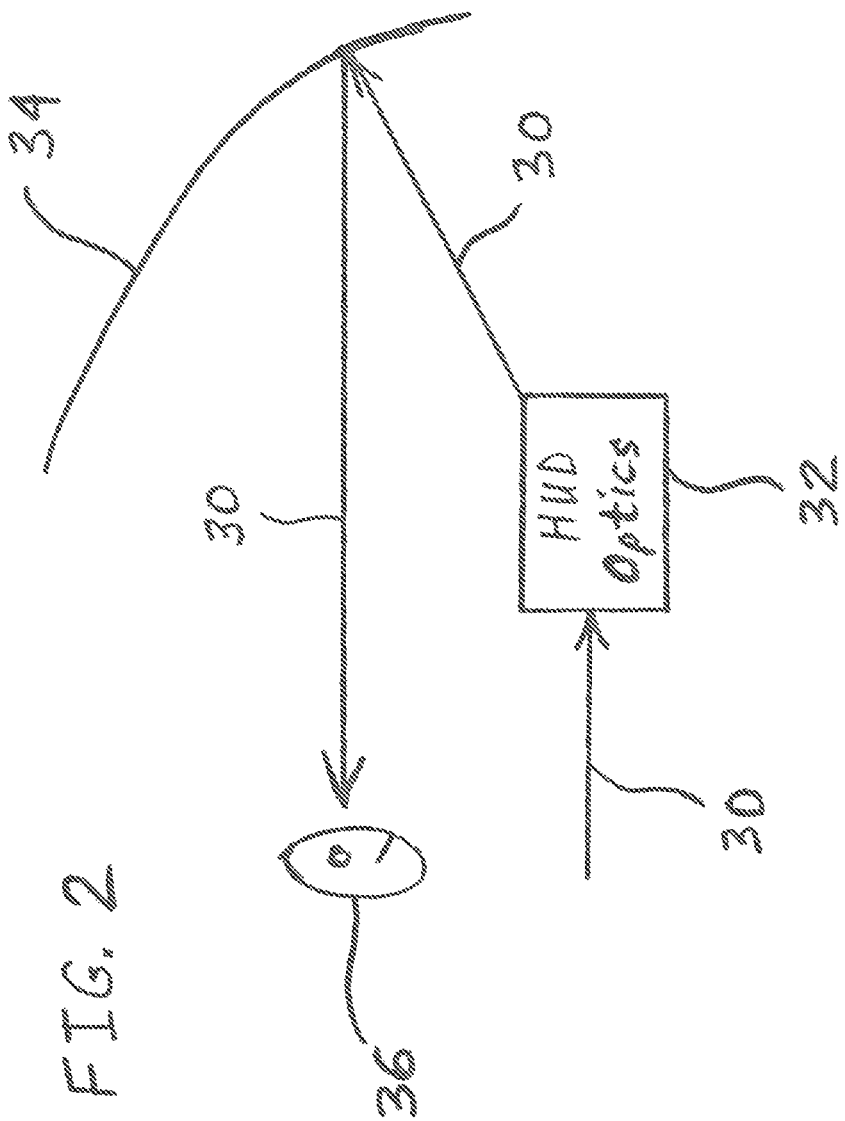
FIG. 2 is a schematic diagram of one embodiment of a HUD optical system which may be suitable for use with the HUD and instrument cluster arrangement of FIG. 1.

During use, LCD 12 is visible as an instrument cluster to a viewer through front vertical polarizer 14. By virtue of HUD backlight 22, area 24 of LCD 12 is also visible as a HUD as a light field 30 is projected through rear horizontal polarizer 16 and notches 26, 28. As illustrated in FIG. 2, light field 30 is received by HUD optics 32 and reflected off of windshield 34 such that light field 30 is visible to a driver 36 of the vehicle as a virtual image which may appear to be disposed outside of windshield 34. HUD optics 32 may include one or more mirrors to reflect light field 30.

Figure 3:
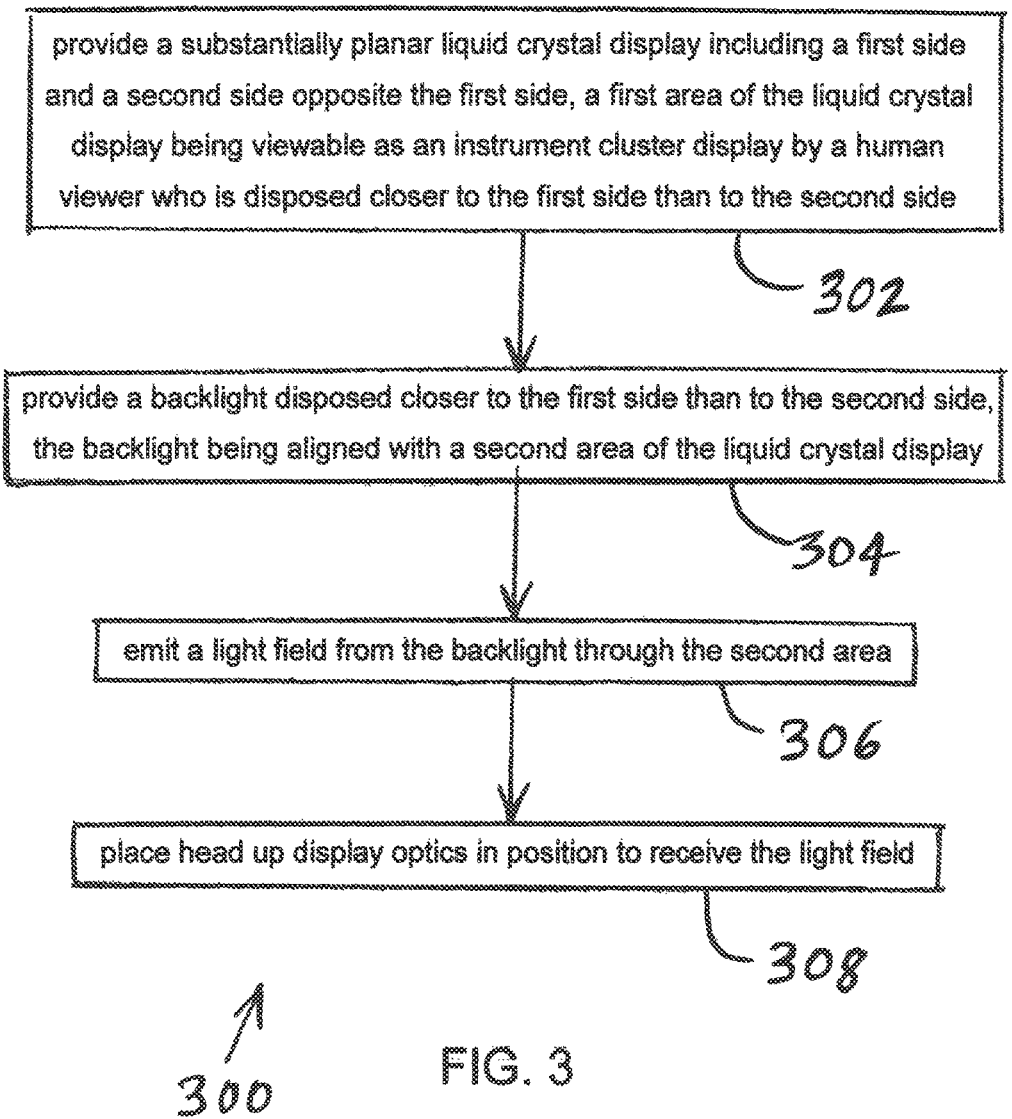
FIG. 3 is a flow chart of one embodiment of a method of the present invention for providing a head up display and an instrument cluster in a motor vehicle.

FIG. 3 illustrate one embodiment of a method 300 of the present invention for providing a head up display and an instrument cluster in a motor vehicle. In a first step 302, a substantially planar liquid crystal display is provided including a first side and a second side opposite the first side. A first area of the liquid crystal display is viewable as an instrument cluster display by a human viewer who is disposed closer to the first side than to the second side. For example, planar liquid crystal display 12 includes a first side facing towards the viewer in FIG. 1 and a second side, which is opposite the first side, and which faces away from the viewer in FIG. 1. The entire area of liquid crystal display 12 other than area 24 may be viewable as an instrument cluster display by a driver or passenger who is viewing from the viewpoint of FIG. 1.

Next, in step 304, a backlight disposed closer to the first side than to the second side is provided. The backlight is aligned with a second area of the liquid crystal display. For example, backlight 22 is closer to the human viewer than is LCD 12. Backlight 22 is aligned with area 24 of LCD 12.

In a next step 306, a light field is emitted from the backlight through the second area. For example, backlight 22 may emit a light field 30 through area 24 of LCD 12.

In a final step 308, head up display optics are placed in position to receive the light field. For example, as shown in FIG. 2, HUD optics 32 are positioned to receive light field 30.

Although the HUD backlight and the corresponding aligned notches are shown as being square, it is to be understood that these elements may have any shape, such as circular, for example.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A combined head up display and instrument cluster arrangement for a motor vehicle, the arrangement comprising:
    a substantially planar liquid crystal display including a first side and a second side opposite the first side, a first area of the liquid crystal display being viewable as an instrument cluster display by a human viewer who is disposed closer to the first side than to the second side;
    a backlight disposed closer to the first side than to the second side, the backlight being aligned with a second area of the liquid crystal display such that a light field is emitted by the backlight through the second area; and
    head up display optics positioned to receive the light field.

2. The combined head up display and instrument cluster arrangement of claim 1 further comprising a planar front vertical polarizer oriented parallel to the liquid crystal display, the liquid crystal display being viewable through the front vertical polarizer as an instrument cluster display by the human viewer, the backlight being attached to the planar front vertical polarizer.

3. The combined head up display and instrument cluster arrangement of claim 1 further comprising a planar rear horizontal polarizer oriented parallel to the liquid crystal display, the light field passing through the rear horizontal polarizer between the second area of the liquid crystal display and the head up display optics.

4. The combined head up display and instrument cluster arrangement of claim 1 further comprising a planar backlight film oriented parallel to the liquid crystal display and disposed closer to the second side than to the first side of the liquid crystal display, the backlight film being configured to illuminate the liquid crystal display as an instrument cluster.

5. The combined head up display and instrument cluster arrangement of claim 4 wherein the backlight film includes a notch through which the light field passes between the second area of the liquid crystal display and the head up display optics.

6. The combined head up display and instrument cluster arrangement of claim 1 further comprising a substantially planar display housing oriented parallel to the liquid crystal display and disposed closer to the second side than to the first side of the liquid crystal display.

7. The combined head up display and instrument cluster arrangement of claim 6 wherein the display housing includes a notch through which the light field passes between the second area of the liquid crystal display and the head up display optics.

8. A method of providing a head up display and an instrument cluster in a motor vehicle, the method comprising:
    providing a substantially planar liquid crystal display including a first side and a second side opposite the first side, a first area of the liquid crystal display being viewable as an instrument cluster display by a human viewer who is disposed closer to the first side than to the second side;
    providing a backlight disposed closer to the first side than to the second side, the backlight being aligned with a second area of the liquid crystal display;
    emitting a light field from the backlight through the second area; and
    placing head up display optics in position to receive the light field.

9. The method of claim 8 further comprising:
    providing a planar front vertical polarizer oriented parallel to the liquid crystal display, the liquid crystal display being viewable through the front vertical polarizer as an instrument cluster display by the human viewer; and
    attaching the backlight to the planar front vertical polarizer.

10. The method of claim 8 further comprising providing a planar rear horizontal polarizer oriented parallel to the liquid crystal display, the light field passing through the rear horizontal polarizer between the second area of the liquid crystal display and the head up display optics.

11. The method of claim 8 further comprising:
    providing a planar backlight film oriented parallel to the liquid crystal display and disposed closer to the second side than to the first side of the liquid crystal display; and using the backlight film to illuminate the liquid crystal display as an instrument cluster.

12. The method of claim 11 wherein the backlight film includes a notch through which the light field passes between the second area of the liquid crystal display and the head up display optics.

13. The method of claim 8 further comprising providing a substantially planar display housing oriented parallel to the liquid crystal display and disposed closer to the second side than to the first side of the liquid crystal display.

14. The method of claim 13 wherein the display housing includes a notch through which the light field passes between the second area of the liquid crystal display and the head up display optics.

15. A motor vehicle, comprising:
   a substantially planar liquid crystal display including a first side and a second side opposite the first side, a first area of the liquid crystal display being viewable as an instrument cluster display by a human viewer who is disposed closer to the first side than to the second side;
   a backlight disposed closer to the first side than to the second side, the backlight being configured to emit a light field through the second area;
   head up display optics positioned to receive the light field after the light field has passed through the second area; and
   a windshield positioned to receive a first reflection of the light field from the head up display optics and provide a second reflection of the light field, the second reflection of the light field being visible to the human viewer as a virtual image.

16. The motor vehicle of claim 15 further comprising a planar front vertical polarizer oriented parallel to the liquid crystal display, the liquid crystal display being viewable through the front vertical polarizer as an instrument cluster display by the human viewer, the backlight being attached to the planar front vertical polarizer.

17. The motor vehicle of claim 15 further comprising a planar rear horizontal polarizer oriented parallel to the liquid crystal display, the light field passing through the rear horizontal polarizer between the second area of the liquid crystal display and the head up display optics.

18. The motor vehicle of claim 15 further comprising a planar backlight film oriented parallel to the liquid crystal display and disposed closer to the second side than to the first side of the liquid crystal display, the backlight film being configured to illuminate the liquid crystal display as an instrument cluster.

19. The motor vehicle of claim 18 wherein the backlight film includes a notch through which the light field passes between the second area of the liquid crystal display and the head up display optics.

20. The motor vehicle of claim 15 further comprising a substantially planar display housing oriented parallel to the liquid crystal display and disposed closer to the second side than to the first side of the liquid crystal display.

21. The motor vehicle of claim 20 wherein the display housing includes a notch through which the light field passes between the second area of the liquid crystal display and the head up display optics.

* * * * *